(12) United States Patent
Brunsen

(10) Patent No.: US 10,277,539 B2
(45) Date of Patent: Apr. 30, 2019

(54) INTELLIGENT MESSAGING REPLY SYSTEM AND METHOD

(71) Applicant: INTERNATIONAL BUSINESS MACHINES CORPORATION, Armonk, NY (US)

(72) Inventor: Kenneth E. Brunsen, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 14/814,980

(22) Filed: Jul. 31, 2015

(65) Prior Publication Data

US 2017/0034084 A1 Feb. 2, 2017

(51) Int. Cl.
*H04L 12/58* (2006.01)

(52) U.S. Cl.
CPC ............ *H04L 51/046* (2013.01); *H04L 51/16* (2013.01)

(58) Field of Classification Search
CPC ................................ H04L 51/26; H04L 51/34
See application file for complete search history.

(56) References Cited

U.S. PATENT DOCUMENTS

| | | | |
|---|---|---|---|
| 7,395,315 B2 | 7/2008 | Colson et al. | |
| 8,874,678 B2 | 10/2014 | Tu | |
| 9,043,411 B2 | 5/2015 | Claux et al. | |
| 2007/0041402 A1* | 2/2007 | Sekaran | H04L 29/06027 370/469 |
| 2008/0028027 A1* | 1/2008 | Jachner | H04L 51/04 709/206 |
| 2009/0172109 A1 | 7/2009 | Weir et al. | |
| 2010/0083149 A1* | 4/2010 | McCaffrey | G06Q 10/107 715/764 |
| 2012/0143960 A1 | 6/2012 | Corrao et al. | |
| 2013/0290436 A1* | 10/2013 | Martin | G06Q 10/107 709/206 |
| 2016/0352667 A1* | 12/2016 | Pickett | H04L 51/16 |

* cited by examiner

*Primary Examiner* — Esther B. Henderson
(74) *Attorney, Agent, or Firm* — Brian J. Colandreo, Esq.; Jeffrey T. Placker, Esq.; Holland & Knight LLP

(57) ABSTRACT

A method, computer program product, and computer system for receiving an input to send a first message as a first reply message to a message thread. One or more updates may be detected from a second message as a second reply message to the message thread in response to receiving the input to send the first message, wherein the second message may be received after the input to send the first message is received and before the first message is sent. Content may be detected in the first message that is unique to the message thread. A third message may be generated to replace the first reply message to the message thread, wherein the third message may include at least one update of the one or more updates from the second message and the content in the first message that is unique to the message thread.

20 Claims, 8 Drawing Sheets

INTELLIGENT MESSAGING REPLY SYSTEM AND METHOD

BACKGROUND

Messaging systems (e.g., email messaging systems) may enable people to exchange electronic messages (e.g., email). When multiple people reply to the same email, a thread may be created. There may be circumstances where, e.g., after user A responds to an email in the thread, and after user A has sent their response, user A may realize that user B may have responded before user A, where the response from user B may include, e.g., a new user added to the email chain (e.g., via cc/to email fields), new content, etc., and thus, the response from user A may no longer be valid (e.g., it is out of date), since it may not include the new user and may not include the new content from the response from user B.

BRIEF SUMMARY OF DISCLOSURE

In one example implementation, a method, performed by one or more computing devices, may include but is not limited to receiving, by a computing device, an input to send a first message as a first reply message to a message thread. One or more updates may be detected from a second message as a second reply message to the message thread in response to receiving the input to send the first message, wherein the second message may be received after the input to send the first message is received and before the first message is sent. Content may be detected in the first message that is unique to the message thread. A third message may be generated to replace the first reply message to the message thread, wherein the third message may include at least one update of the one or more updates from the second message and the content in the first message that is unique to the message thread.

One or more of the following example features may be included. The input may be a reply object. The input may be a send object. The content in the first message that is unique to the message thread may include an attachment. The content in the first message that is unique to the message thread may include content in a body portion of the first message. Generating the third message to replace the first reply message to the message thread may include receiving a prompt with an option to replace the first reply message to the message thread with the at least one update from the second message. The prompt may include selectable updates of the one or more updates to include when generating the third message to replace the first reply message.

In another example implementation, a computing system includes a processor and a memory configured to perform operations that may include but are not limited to receiving an input to send a first message as a first reply message to a message thread. One or more updates may be detected from a second message as a second reply message to the message thread in response to receiving the input to send the first message, wherein the second message may be received after the input to send the first message is received and before the first message is sent. Content may be detected in the first message that is unique to the message thread. A third message may be generated to replace the first reply message to the message thread, wherein the third message may include at least one update of the one or more updates from the second message and the content in the first message that is unique to the message thread.

One or more of the following example features may be included. The input may be a reply object. The input may be a send object. The content in the first message that is unique to the message thread may include an attachment. The content in the first message that is unique to the message thread may include content in a body portion of the first message. Generating the third message to replace the first reply message to the message thread may include receiving a prompt with an option to replace the first reply message to the message thread with the at least one update from the second message. The prompt may include selectable updates of the one or more updates to include when generating the third message to replace the first reply message.

In another example implementation, a computer program product resides on a computer readable storage medium that has a plurality of instructions stored on it. When executed by a processor, the instructions cause the processor to perform operations that may include but are not limited to receiving an input to send a first message as a first reply message to a message thread. One or more updates may be detected from a second message as a second reply message to the message thread in response to receiving the input to send the first message, wherein the second message may be received after the input to send the first message is received and before the first message is sent. Content may be detected in the first message that is unique to the message thread. A third message may be generated to replace the first reply message to the message thread, wherein the third message may include at least one update of the one or more updates from the second message and the content in the first message that is unique to the message thread.

One or more of the following example features may be included. The input may be a reply object. The input may be a send object. The content in the first message that is unique to the message thread may include an attachment. The content in the first message that is unique to the message thread may include content in a body portion of the first message. Generating the third message to replace the first reply message to the message thread may include receiving a prompt with an option to replace the first reply message to the message thread with the at least one update from the second message. The prompt may include selectable updates of the one or more updates to include when generating the third message to replace the first reply message.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
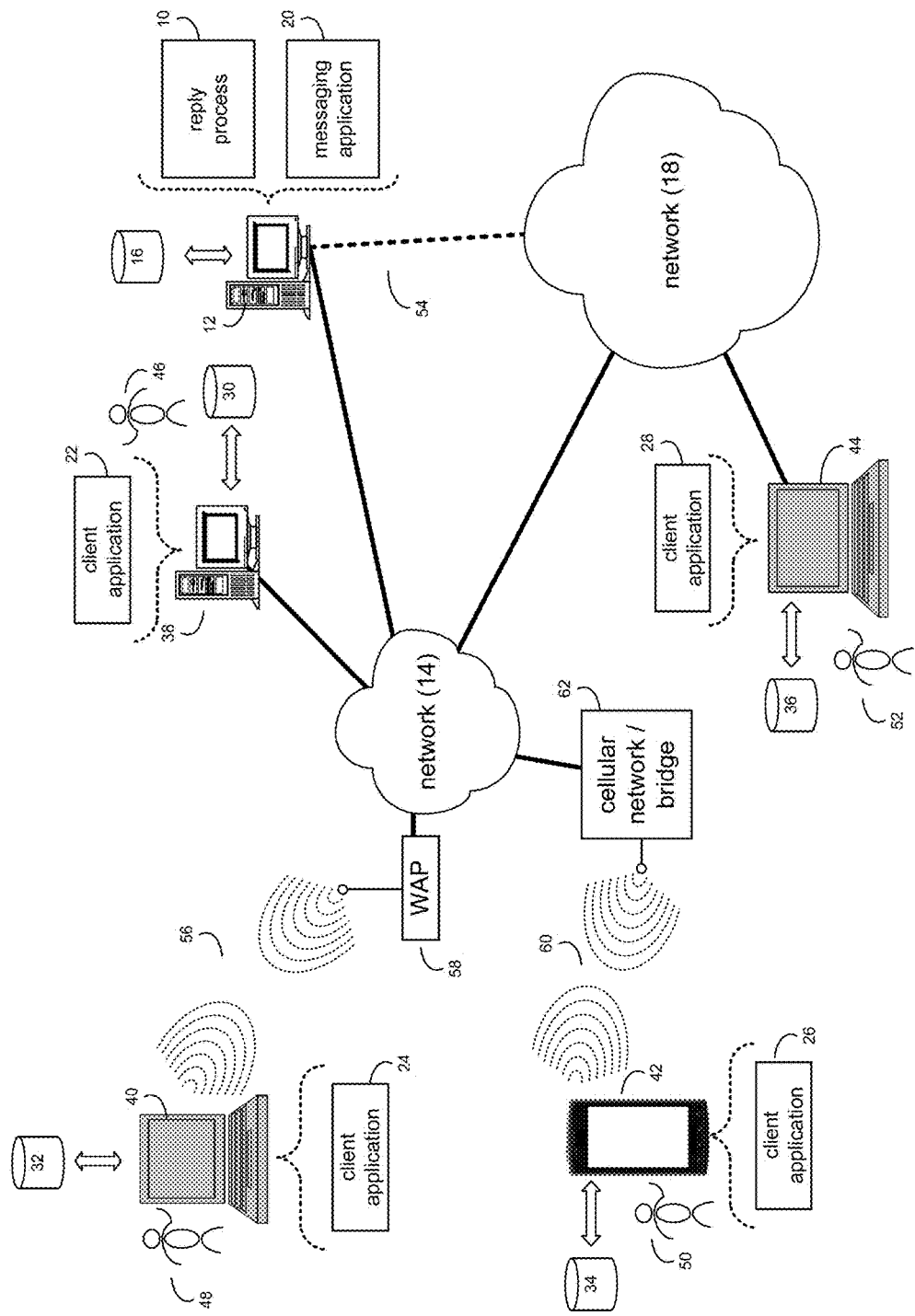
FIG. 1 is an example diagrammatic view of a reply process coupled to a distributed computing network according to one or more example implementations of the disclosure.

System Overview:

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown reply process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, reply process 10 may receive, by a computing device, an input to send a first message as a first reply message to a message thread. One or more updates may be detected from a second message as a second reply message to the message thread in response to receiving the input to send the first message, wherein the second message may be received after the input to send the first message is received and before the first message is sent. Content may be detected in the first message that is unique to the message thread. A third message may be generated to replace the first reply message to the message thread, wherein the third message may include at least one update of the one or more updates from the second message and the content in the first message that is unique to the message thread.

The instruction sets and subroutines of reply process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. The data store may also be a custom database, such as, for example, a flat file database or an XML database. Any other form(s) of a data storage structure and/or organization may also be used. Reply process 10 may be a component of the data store, a standalone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a messaging application (e.g., messaging application 20), examples of which may include, but are not limited to, e.g., an email application, a scheduling application, an Instant Messaging (IM)/"chat" application, a short messaging service (SMS)/multimedia messaging service (MMS) application, a social media application, or other application that allows for electronic messaging. Reply process 10 and/or messaging application 20 may be accessed via client applications 22, 24, 26, 28. Reply process 10 may be a standalone application, or may be an applet/application/script/extension that may interact with and/or be executed within messaging application 20, a component of messaging application 20, and/or one or more of client applications 22, 24, 26, 28. Messaging application 20 may be a standalone application, or may be an applet/application/script/extension that may interact with and/or be executed within reply process 10, a component of reply process 10, and/or one or more of client applications 22, 24, 26, 28. One or more of client applications 22, 24, 26, 28 may be a standalone application, or may be an applet/application/script/extension that may interact with and/or be executed within and/or be a component of reply process 10 and/or messaging application 20. Examples of client applications 22, 24, 26, 28 may include, but are not limited to, e.g., an email application, a scheduling application, an Instant Messaging (IM)/"chat" application, a short messaging service (SMS)/multimedia messaging service (MMS) application, a social media application, or other application that allows for electronic messaging, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of reply process 10 (and vice versa). Accordingly, reply process 10 may be a purely server-side application, a purely client-side application, or a hybrid server-side/client-side application that is cooperatively executed by one or more of client applications 22, 24, 26, 28 and/or reply process 10.

One or more of client applications 22, 24, 26, 28 may be configured to effectuate some or all of the functionality of messaging application 20 (and vice versa). Accordingly, messaging application 20 may be a purely server-side application, a purely client-side application, or a hybrid server-side/client-side application that is cooperatively executed by one or more of client applications 22, 24, 26, 28 and/or messaging application 20. As one or more of client applications 22, 24, 26, 28, reply process 10, and messaging application 20, taken singly or in any combination, may effectuate some or all of the same functionality, any description of effectuating such functionality via one or more of client applications 22, 24, 26, 28, reply process 10, messaging application 20, or combination thereof, and any described interaction(s) between one or more of client applications 22, 24, 26, 28, reply process 10, messaging application 20, or combination thereof to effectuate such functionality, should be taken as an example only and not to limit the scope of the disclosure.

Users 46, 48, 50, 52 may access computer 12 and reply process 10 (e.g., using one or more of client electronic devices 38, 40, 42, 44) directly through network 14 or through secondary network 18. Further, computer 12 may be connected to network 14 through secondary network 18, as illustrated with phantom link line 54. Reply process 10 may include one or more user interfaces, such as browsers and textual or graphical user interfaces, through which users 46, 48, 50, 52 may access reply process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
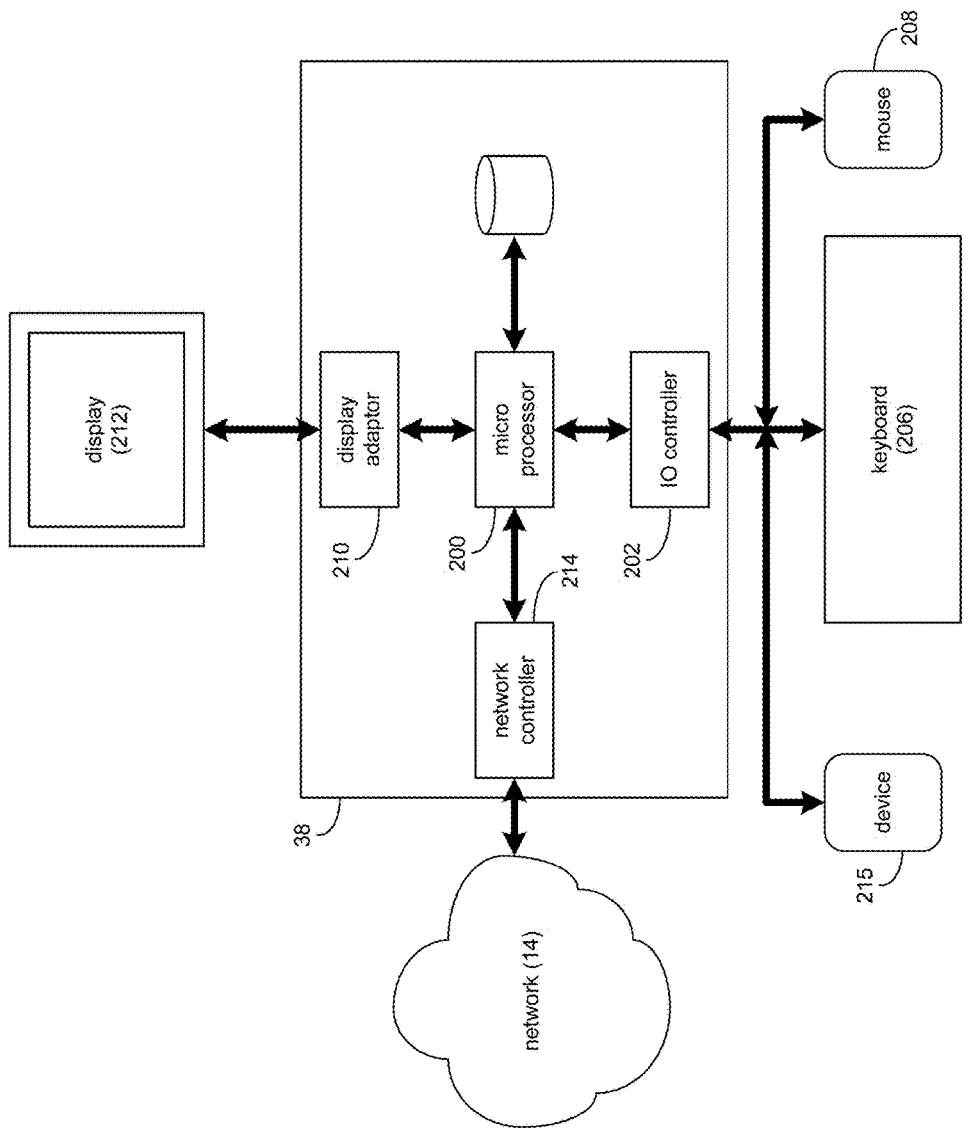
FIG. 2 is an example diagrammatic view of a client electronic device of FIG. 1 according to one or more example implementations of the disclosure.
Figure 3:
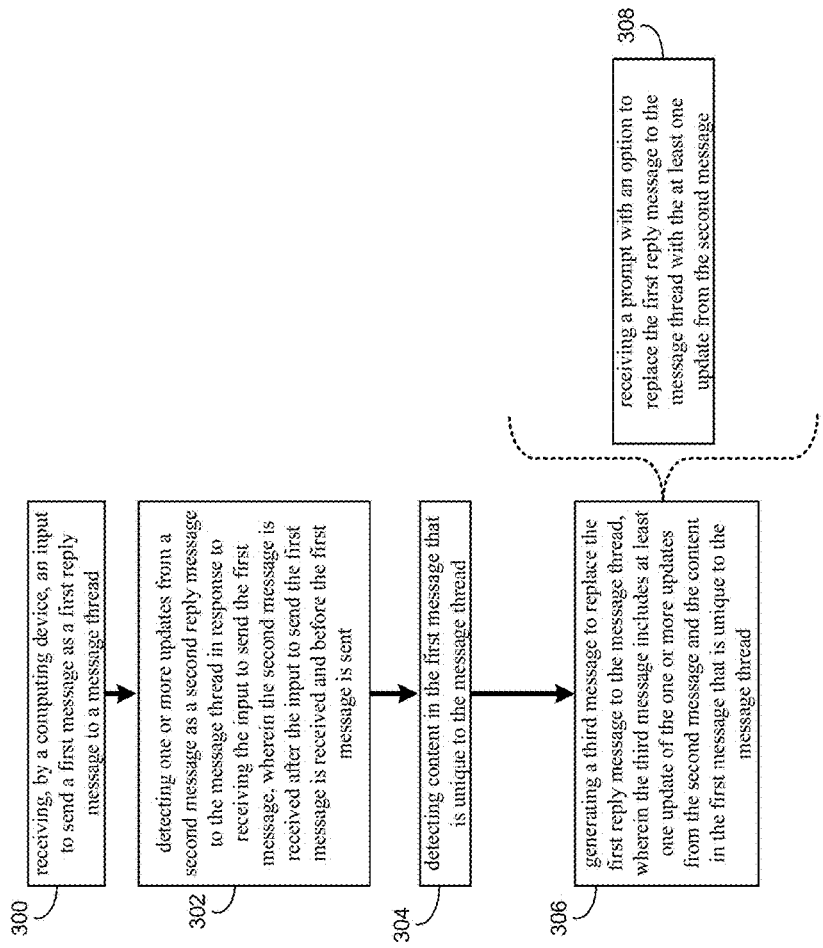
FIG. 3 is an example flowchart of the reply process of FIG. 1 according to one or more example implementations of the disclosure.
Figure 4:
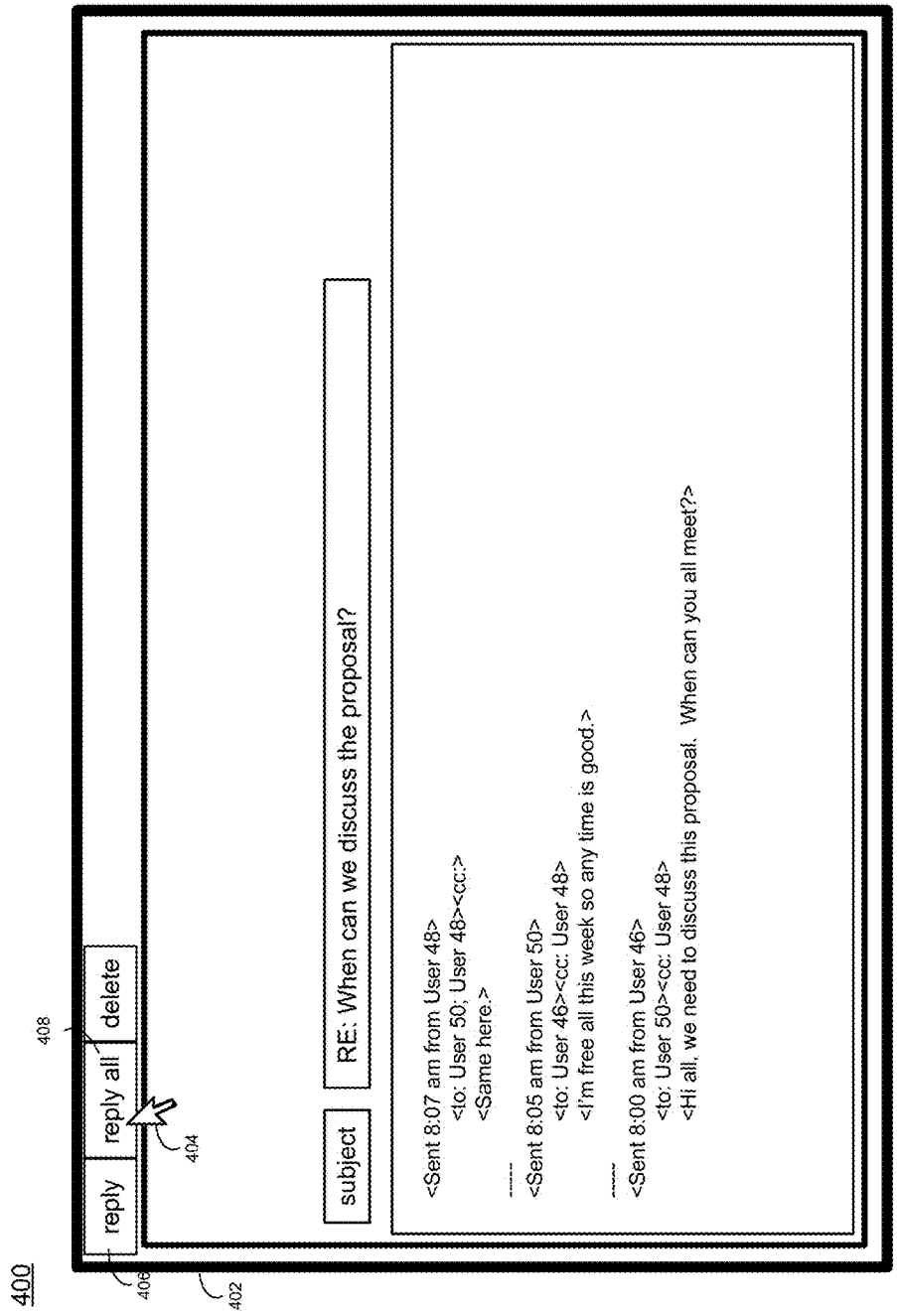
FIG. 4 is an example diagrammatic view of a screen image displayed by the reply process of FIG. 1 according to one or more example implementations of the disclosure.
Figure 5:
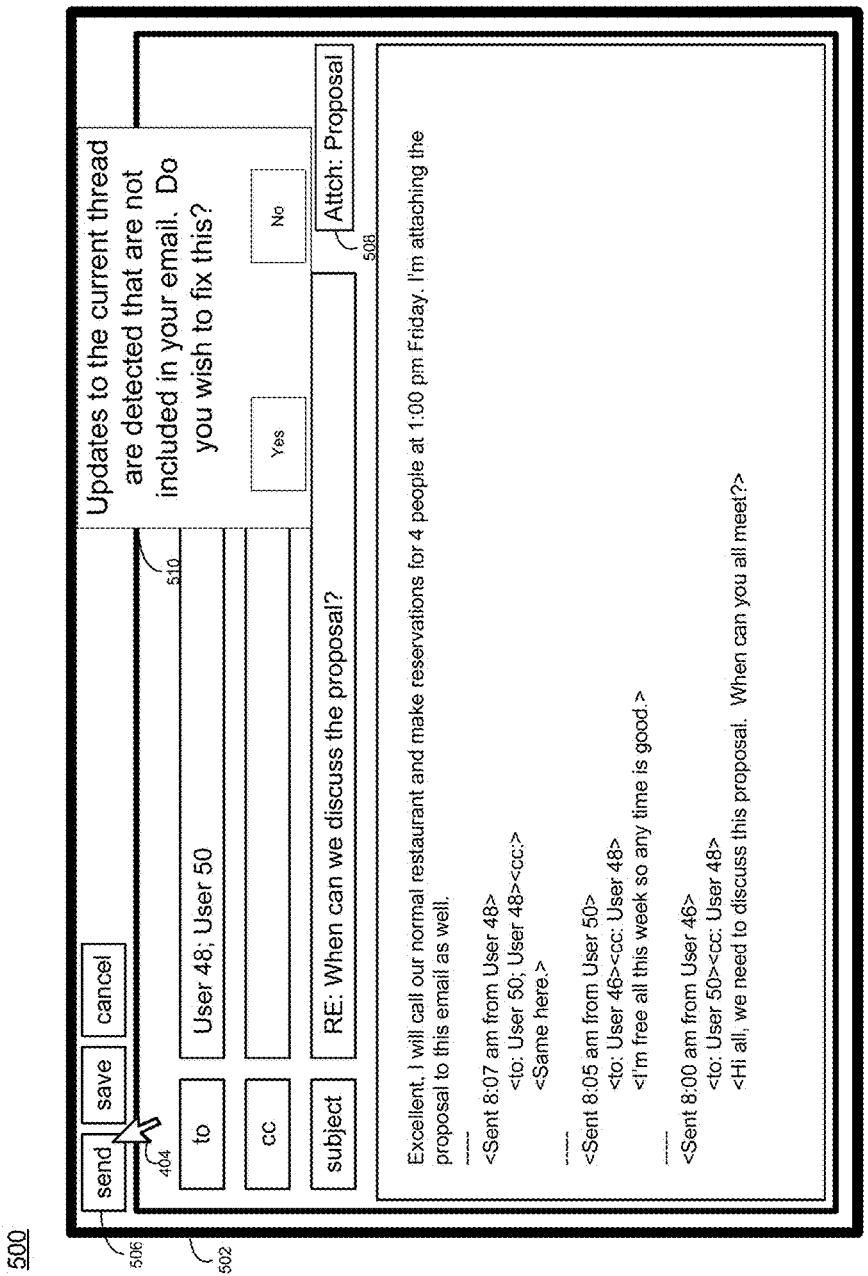
FIG. 5 is an example diagrammatic view of a screen image displayed by the reply process of FIG. 1 according to one or more example implementations of the disclosure.
Figure 6:
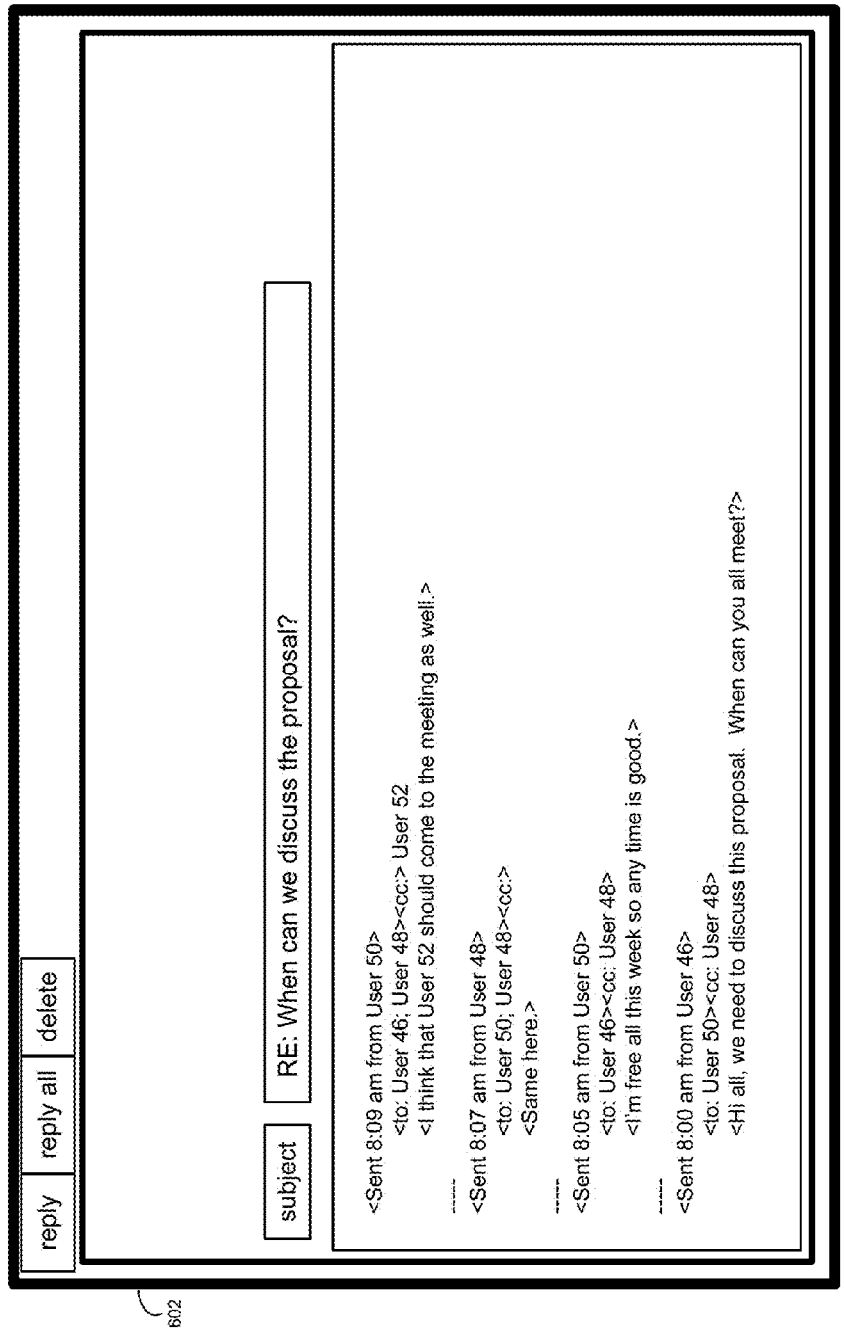
FIG. 6 is an example diagrammatic view of a screen image displayed by the reply process of FIG. 1 according to one or more example implementations of the disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, reply process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

The Reply Process:

As discussed above and referring also at least to FIGS. 3-8, reply process 10 may receive 300, by a computing device, an input to send a first message as a first reply message to a message thread. Reply process 10 may detect 302 one or more updates from a second message as a second reply message to the message thread in response to receiving 300 the input to send the first message, wherein the second message may be received after the input to send the first message is received and before the first message is sent. Reply process 10 may detect 304 content in the first message that is unique to the message thread. Reply process 10 may generate 306 a third message to replace the first reply message to the message thread, wherein the third message may include at least one update of the one or more updates from the second message and the content in the first message that is unique to the message thread.

As noted above, messaging systems (e.g., email messaging systems) may enable people to exchange electronic messages (e.g., email). When multiple people reply to the same email, a thread may be created. There may be circumstances where, e.g., after user A responds to an email in the thread, and after user A has sent their response, user A may realize that user B may have responded before user A, where the response from user B may include, e.g., a new user added to the email chain (e.g., via cc/to email fields), new content in the body portion of the email, etc., and thus, the response from user A may no longer be valid (e.g., it is out of date), since it may not include the new user and may not include the new content from the response from user B. In some implementations, as will be discussed below, reply process 10 may help to avoid such an example situation.

It will be appreciated that while example implementations are discussed using email, other examples of messaging may also be used without departing from the scope of the disclosure. For example, the messages may include, e.g., Instant Messaging (IM)/"chat" messages, a short messaging service (SMS)/multimedia messaging service (MMS) messages, social media messages (e.g., posting on a message board), or any other types of similar messaging. As such, the use of email message should be taken as an example only and not to limit the scope of the disclosure.

In some implementations, reply process 10 may receive 300, by a computing device, an input to send a first message as a first reply message to a message thread. For instance, and referring at least to FIG. 4, an example user interface (e.g., UI 400 associated with reply process 10, messaging application 20, client application 22, or combination thereof) is shown. Assume for example purposes only that an email thread includes multiple messages between, e.g., three users, such as User 46, User 48, and User 50. In some implementations, reply process 10 may include the ability to maintain a "thread" hierarchy, which may involve the ability to trace the message thread.

In the example, further assume that three email messages have already been sent within the same thread, and may be shown in the body portion of the email (e.g., email 402), with the original "first" email sent at 8:00 am from User 46 (to: User 50; cc: User 48), the next "second" email sent at 8:05 am from User 50 (to: User 46; cc: User 48), and a subsequent "third" email sent at 8:07 am from User 48 (to: User 50; 48). Further assume that user 46 (e.g., via reply process 10) desires to reply to the most recent email in the thread. In some implementations, the input may be a reply object. In the example, user 46 may (e.g., via cursor 404) select an object (e.g., the reply object), such as "reply" 406 and/or "reply all" 408. Further in the example, reply process 10 may receive 300 the input (e.g., the selected "reply all" 408 reply object) to send a first message as a first reply message to a message thread.

To avoid confusion, the use of the terms "first message" and "first reply" are not meant to imply any particular order of messages in the email thread unless the context clearly suggests otherwise. For instance, in the example, when reply process 10 receives 300 the input (e.g., the selected "reply all" 408 reply object) to send a first message as a first reply message to a message thread, the "first message" as the "first reply message" may be the fourth message as the fourth reply message in the message thread. As such, the use of "first reply" and "first message" should not be taken to imply any particular order of messages in the email thread.

In some implementations, the input may be a send object. For example, and referring at least to FIG. 5, an example user interface (e.g., UI 500 associated with reply process 10, messaging application 20, client application 22, or combination thereof) is shown. In the example, by selecting "reply all" 408 to email message 402 as the received 300 input, a fourth reply email message (e.g., reply email 502) in the message thread may be generated. Further in the example, user 46 may (e.g., via cursor 404) select an object (e.g., the send object), such as "send" 506. Further in the example, reply process 10 may receive 300 the input (e.g., the selected "reply all" 408 reply object) to send a first message as a first reply message to a message thread.

In some implementations, reply process 10 may detect 302 one or more updates from a second message as a second reply message to the message thread in response to receiving 300 the input to send the first message, wherein the second message may be received after the input to send the first message is received and before the first message is sent. In some implementations, reply process 10 may poll for email updates and/or may search to see if there have been any newer replies to this messaging thread to detect 302 the above noted updates. For instance, assume for example purposes only, that at or between the time when reply process 10 receives 300 "reply all" 408 input (to draft a reply email to the most recent email message in the thread) and/or "send" 506 input (to send the reply email to the most recent email message in the thread), another reply message is sent from User 50 and/or received by reply process 10 (i.e., before reply email 402 is actually sent). For instance, and referring at least to FIG. 6, an example user interface (e.g., UI 600 associated with reply process 10, messaging application 20, client application 22, or combination thereof) is shown with the above-noted "another reply message" (reply message 602) sent from User 50. In the example, reply message 602 has an additional recipient (e.g., User 52) added to the message thread, as well as additional content in the body of the message thread (e.g., "I think that User 52 should come to the meeting as well"). In the example, reply message 502 would not include User 52 as a recipient, and would not include the additional content (from reply message 602) in the body of the message thread. Similarly, any subsequent replies to reply message 602 would not include the additional content from reply message 502. As such, if reply message 502 were sent, it would be out of date and a "fork" with differing threads may be created (e.g., the original thread, and the new thread with the additional recipient and additional content).

In some implementations, upon detecting 302 the above-noted updates from reply message 602 received after the input to send reply message 502 and before reply message 502 is sent, reply process 10 may halt or preclude reply message 502 from being sent. In some implementations, reply process 10 may generate 306 a third message to replace the first reply message to the message thread, wherein the third message may include at least one update of the one or more updates from the second message and the content in the first message that is unique to the message thread. For instance, in some implementations, reply process 10 may detect 304 content in the first message that is unique to the message thread. For example, and referring again at least to FIG. 5, the content in the first message (e.g., reply message 502) that is unique to the message thread may include content in a body portion of the first message. For instance, in the example, user 46 was responding to reply message 402, by adding the content of "Excellent, I will call our normal restaurant and make reservations for 4 people at 1:00 pm Friday. I'm attaching the proposal to this email as well." in the body portion of reply message 502. In some implementations, the content in the first message that is unique to the message thread may include an attachment. For instance, in the example, user 46 was responding to reply message 402, by adding an attachment (e.g., attachment 508) as the unique content in reply message 502.

In some implementations, generating 306 the third message to replace the first reply message to the message thread may include receiving 308 a prompt with an option to replace the first reply message to the message thread with the at least one update from the second message. For instance, and referring again at least to FIG. 5, reply process 10 may provide a prompt (e.g., prompt 510) which may alert user 46 that updates to the thread have been detected 302 that are not included in reply message 502. In some implementations, prompt 510 may be a pop-up window or other object. In the example, prompt 510 may provide the option for user 46 to select the option of whether to fix the issue (e.g., by generating a replacement message instead of using reply message 502) or not. Reply process 10, once the prompt with the (selected) option is received 308, may proceed as instructed.

Figure 7:
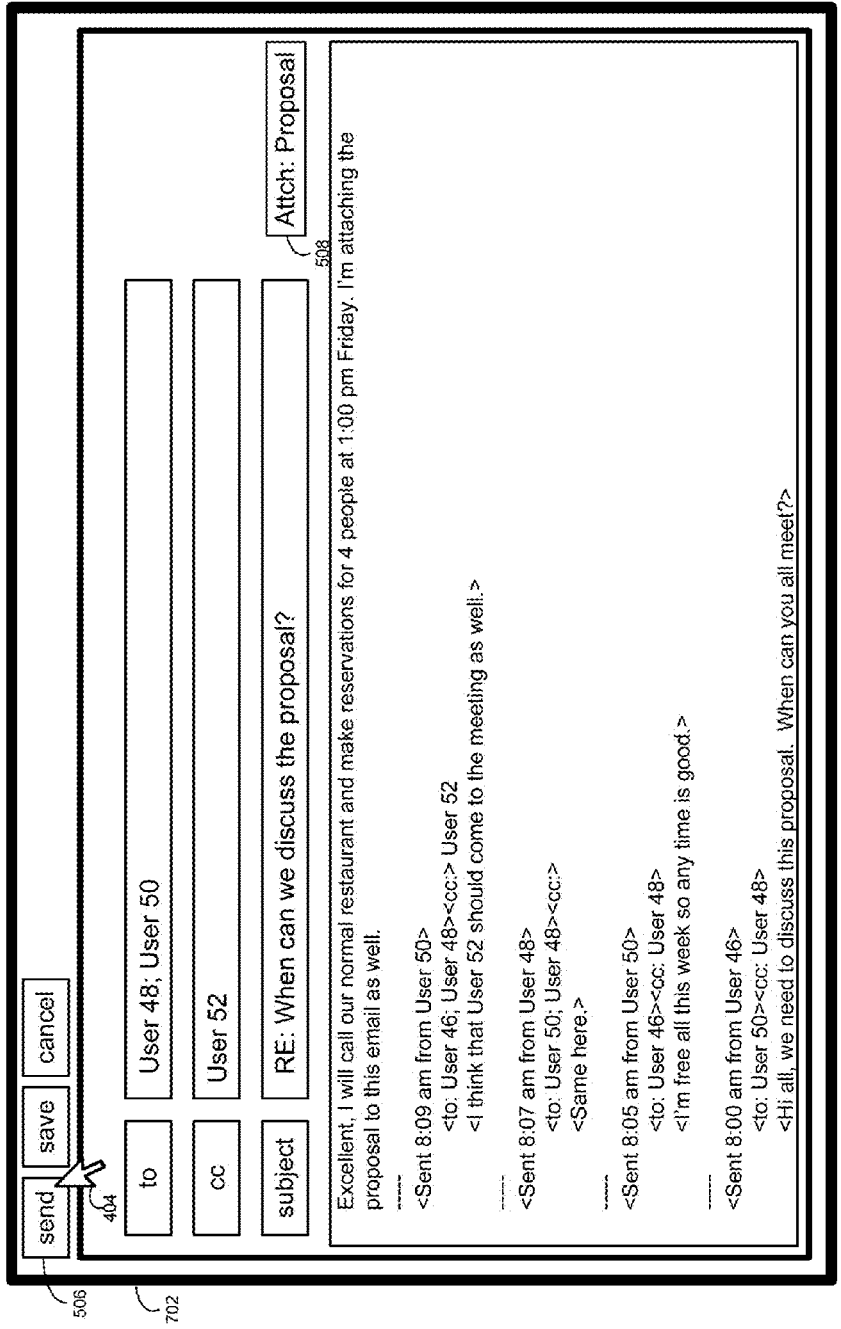
FIG. 7 is an example diagrammatic view of a screen image displayed by the reply process of FIG. 1 according to one or more example implementations of the disclosure.
Figure 8:
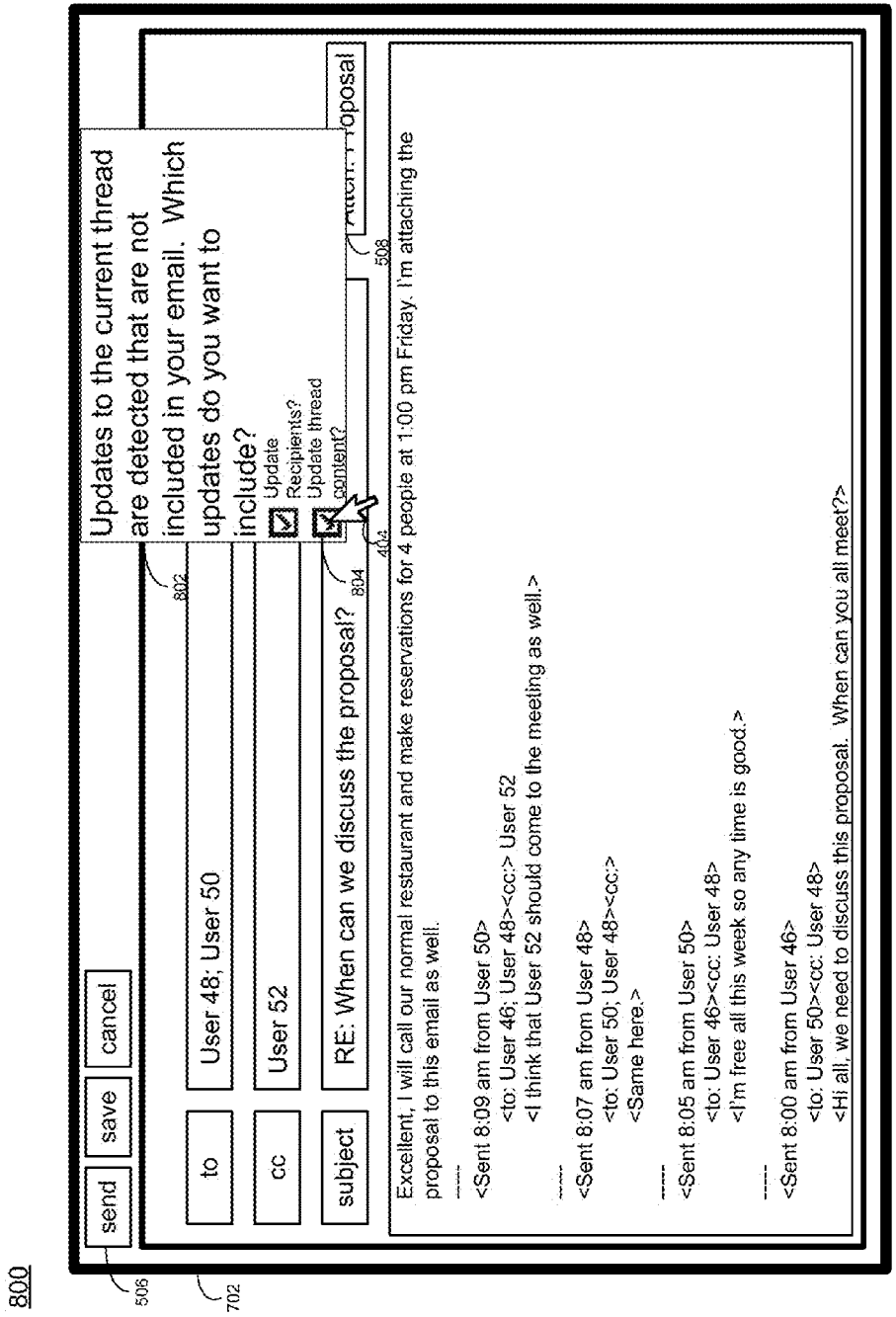
FIG. 8 is an example diagrammatic view of a screen image displayed by the reply process of FIG. 1 according to one or more example implementations of the disclosure.

In the example, and referring at least to FIG. 7, assuming the received 308 prompt 510 was selected with the option to fix the issue, reply process 10 may generate 306 a new message (e.g., reply message 702 shown via UI 700) to replace reply message 502, which may include the detected 302 updates from reply message 602 (e.g., the added recipient User 50 and additional content in the body portion of reply message 602), as well as the detected 304 content in reply message 502 that is unique to the thread (e.g., the added content in the body portion and the attachment). Thus, user 46 will be replying to the most up to date thread. It will be understood that reply process 10 may enable user 46 to make further edits to reply message 702 as may similarly be done during the course of a typical email reply message, as the content of the reply message may require further changes based on the other responses (i.e., the above-noted updates) incorporated into the new response.

In some implementations, assuming the received 308 prompt 510 was selected with the option not to fix the issue, reply process 10 may further provide an additional prompt feature inquiring whether or not user 46 would at least like to add the new recipient (e.g., User 52) to reply message 502. It will be appreciated that the above-noted detected 304 content in reply message 502 that is unique to the thread need not be present in reply message 702 when initially generated. For instance, assume for example purposes only that when reply process 10 receives 300 "reply all" 408 input (to draft a reply email to the most recent email message in the thread), another reply message has already been detected 302 having been sent from User 50 and/or received by reply process 10 (e.g., before generating reply email 502). In some implementations, reply process 10 may generate reply email 502, which when initially generated, is based off of reply email 602, but does not yet have any of the content unique to the thread as user 46 has not yet created the unique content. It will also be appreciated that reply process 10 may continuously (e.g., at particular intervals) poll for email updates and/or may search to see if there have been any newer replies to this messaging thread to detect 302 the above noted updates, and upon detection 302 automatically provide prompt 510 at any time while reply email 502 is being drafted/edited.

In some implementations, the prompt may include selectable updates of the one or more updates to include when generating 306 the third message to replace the first reply message. For instance, and referring again at least to FIG. 8, reply process 10 may provide a prompt (e.g., prompt 802) which may alert user 46 that updates to the thread have been detected 302 that are not included in reply message 502. In some implementations, reply process 10 may provide annotations (e.g., highlighting, font/color changes, etc.) in reply message 702 to provide a visual identification of which updates to the thread have been detected 302 that are not included in reply message 502.

In some implementations, prompt 510 may be a pop-up window or other object. In the example, prompt 510 may provide the option for user 46 to select which updates to include in reply message 602 (e.g., by generating a replacement message instead of using reply message 502). Reply process 10, once the prompt with the (selected) option is received 308, may proceed as instructed. In the example, assuming the received 308 prompt 802 was selected with the option to fix only the recipients, reply process 10 may generate 306 a new message (e.g., reply message 702 shown via UI 800) to replace reply message 502, which may include the detected 302 updates from reply message 602 (e.g., the added recipient User 50, but not the additional content in the body portion of reply message 602), and depending upon whether reply process 10 has detected 304 content in reply message 502 that is unique to the thread (e.g., the added content in the body portion and the attachment), the detected content may be added as well.

Similarly, assuming the received 308 prompt 802 was selected with the option to fix only the additional content in the body portion of reply message 602 (e.g., via checkbox 804), reply process 10 may generate 306 a new message (e.g., reply message 702 shown via UI 800) to replace reply message 502, which may include the detected 302 updates from reply message 602 (e.g., the additional content in the body portion of reply message 602 but not the added recipient User 50), and depending upon whether reply process 10 has detected 304 content in reply message 502 that is unique to the thread (e.g., the added content in the body portion and the attachment), the detected content may be added as well.

Similarly, assuming the received 308 prompt 802 was selected with the option to fix both the recipients and the additional content in the body portion of reply message 602, reply process 10 may generate 306 a new message (e.g., reply message 702 shown via UI 800) to replace reply message 502, which may include the detected 302 updates from reply message 602 (e.g., the additional content in the body portion of reply message 602 and the added recipient User 50), and depending upon whether reply process 10 has detected 304 content in reply message 502 that is unique to the thread (e.g., the added content in the body portion and the attachment), the detected content may be added as well.

As such, in some implementations, instead of user 46 having to start from scratch by creating reply message 702, and then manually reattach the attachment and/or cut/paste the unsent response from reply message 502, reply process 10 may provide techniques to automatically do so. Thus, user 46 may be required to do little or no extra work to maintain up to date thread responses.

It will be appreciated that reply message 702 need not be an entirely new message generated 306 by reply process 10. For example, reply message 702 may be similarly generated as reply message 502, in which editing of reply message 502 is available. In the example, reply process 10 may use prompt 510/802 to edit reply message 502 to the extent desired by user 46 as noted above. As such, the description of generating an entirely new email should be taken as an example only and not to limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
receiving, by a computing device, an input to send a first message as a first reply message to a message thread;
detecting one or more updates from a second message as a second reply message to the message thread in response to receiving the input to send the first message, wherein the second message is received after the input to send the first message is received and before the first message is sent;
detecting content in the first message that is unique to the message thread, wherein detecting the one or more updates from the second reply message, received after the input to send the first reply message and before the first reply message is sent, includes receiving an alert that precludes the first reply message from being sent upon detecting the one or more updates from the second reply message to the message thread; and
generating a third message to replace the first reply message precluded from being sent to the message thread, wherein the third message includes at least one update of the one or more updates from the second message and the content in the first message that is unique to the message thread.

2. The computer-implemented method of claim 1 wherein the input is a reply object.

3. The computer-implemented method of claim 1 wherein the input is a send object.

4. The computer-implemented method of claim 1 wherein the content in the first message that is unique to the message thread includes an attachment.

5. The computer-implemented method of claim 1 wherein the content in the first message that is unique to the message thread includes content in a body portion of the first message.

6. The computer-implemented method of claim 1 wherein generating the third message to replace the first reply message to the message thread includes receiving a prompt with an option to replace the first reply message to the message thread with the at least one update from the second message.

7. The computer-implemented method of claim 6 wherein the prompt includes selectable updates of the one or more updates to include when generating the third message to replace the first reply message.

8. A computer program product residing on a non-transitory computer readable storage medium having a plurality of instructions stored thereon which, when executed by a processor, cause the processor to perform operations comprising:
receiving an input to send a first message as a first reply message to a message thread;
detecting one or more updates from a second message as a second reply message to the message thread in response to receiving the input to send the first message, wherein the second message is received after the input to send the first message is received and before the first message is sent;
detecting content in the first message that is unique to the message thread, wherein detecting the one or more updates from the second reply message, received after the input to send the first reply message and before the first reply message is sent, includes receiving an alert that precludes the first reply message from being sent upon detecting the one or more updates from the second reply message to the message thread; and
generating a third message to replace the first reply message precluded from being sent to the message thread, wherein the third message includes at least one update of the one or more updates from the second message and the content in the first message that is unique to the message thread.

9. The computer program product of claim 8 wherein the input is a reply object.

10. The computer program product of claim 8 wherein the input is a send object.

11. The computer program product of claim 8 wherein the content in the first message that is unique to the message thread includes an attachment.

12. The computer program product of claim 8 wherein the content in the first message that is unique to the message thread includes content in a body portion of the first message.

13. The computer program product of claim 8 wherein generating the third message to replace the first reply message to the message thread includes receiving a prompt with an option to replace the first reply message to the message thread with the at least one update from the second message.

14. The computer program product of claim 13 wherein the prompt includes selectable updates of the one or more updates to include when generating the third message to replace the first reply message.

15. A computing system including a processor and a memory configured to perform operations comprising:
receiving an input to send a first message as a first reply message to a message thread;
detecting one or more updates from a second message as a second reply message to the message thread in response to receiving the input to send the first message, wherein the second message is received after the input to send the first message is received and before the first message is sent;
detecting content in the first message that is unique to the message thread, wherein detecting the one or more updates from the second reply message, received after the input to send the first reply message and before the first reply message is sent, includes receiving an alert that precludes the first reply message from being sent upon detecting the one or more updates from the second reply message to the message thread; and
generating a third message to replace the first reply message precluded from being sent to the message thread, wherein the third message includes at least one update of the one or more updates from the second message and the content in the first message that is unique to the message thread.

16. The computing system of claim 15 wherein the input is a reply object.

17. The computing system of claim 15 wherein the input is a send object.

18. The computing system of claim 15 wherein the content in the first message that is unique to the message thread includes an attachment.

19. The computing system of claim 15 wherein the content in the first message that is unique to the message thread includes content in a body portion of the first message.

20. The computing system of claim 15 wherein generating the third message to replace the first reply message to the message thread includes receiving a prompt with an option to replace the first reply message to the message thread with the at least one update from the second message.

* * * * *